United States Patent [19]

Burr et al.

[11] 4,408,163

[45] Oct. 4, 1983

[54] METHOD AND APPARATUS FOR DETERMINING BEAM DIMENSIONS AT THE SCREEN OF A SHADOW MASK CATHODE-RAY TUBE

[75] Inventors: Peter Burr, Winchester, all of; Brian D. Chase; Andrew Paton, both of Eastleigh; Brian R. Sowter, Winchester, England

[73] Assignee: International Business Machines Corporation, Armonk, N.Y.

[21] Appl. No.: 212,284

[22] Filed: Dec. 2, 1980

[30] Foreign Application Priority Data

Dec. 7, 1979 [GB] United Kingdom ............... 7942391

[51] Int. Cl.³ .......................................... G01R 31/024
[52] U.S. Cl. .................................. 324/404; 356/121
[58] Field of Search ........................ 356/121; 324/404

[56] References Cited

U.S. PATENT DOCUMENTS

| | | | |
|---|---|---|---|
| 2,777,113 | 1/1957 | Packard | 324/20 |
| 3,028,544 | 4/1962 | Stone | 324/20 |
| 3,723,801 | 3/1973 | Oxenham | 324/20 |
| 3,892,052 | 7/1975 | Wolfgram | 356/121 |
| 4,001,877 | 1/1977 | Simpson | 358/10 |

FOREIGN PATENT DOCUMENTS 1220900 1/1971 United Kingdom .
1495161 12/1977 United Kingdom .

OTHER PUBLICATIONS

P. Griffis, Kinescope Spot Size as it Relates to Picture Quality, vol. cl 23, No. 1, Feb. 1977, pp. 14–21, IEEE Trans on Consumer Electronics.

J. Bruder, Inst. for Mapping Light Intensity Contours, IEEE Trans on Vehicular Tech., vol. VT 19, No. 3, Aug. 1970, pp. 225–229.

*Primary Examiner*—Michael J. Tokar
*Attorney, Agent, or Firm*—Frederick D. Poag

[57] ABSTRACT

The dimensions and light output of a beam in a shadow mask cathode-ray tube are determined by means of an optical system 7 focussed on a phosphor dot to pick up and record the light generated by a ray 4 passing through a single aperture 6 in the shadow mask 2. The cathode-ray beam 1 is moved so that the whole cross-section of the beam passes the aperture 4. The detected light outputs are plotted to provide an accurate representation of the whole beam. Repeating the procedure for each gun gives a precise record of the misconvergence of the beam

8 Claims, 6 Drawing Figures

METHOD AND APPARATUS FOR DETERMINING BEAM DIMENSIONS AT THE SCREEN OF A SHADOW MASK CATHODE-RAY TUBE

FIELD OF THE INVENTION

This invention relates to a method and apparatus for determining the detailed shape and light output characteristic of a single spot on the screen of a shadow mask cathode-ray tube screen.

BACKGROUND OF THE INVENTION

The requirement for a color cathode-ray tube data display imposes high standards on the operating performance of the tube and particularly on the size and shape of the spot traced on the screen by the cathode-ray beam.

One method used in measuring the spot size of a monochrome cathode-ray tube is the so-called "shrinking raster" technique. A raster of lines is traced on the screen and the space between the lines reduced until the screen appears to have uniform brightness. If the distribution of light output at the spot is gaussian, this technique gives the line width at about 60% of peak brightness. If, however, the distribution is not gaussian, the determination of line width is likely to vary considerably from the 60% value. The "shrinking raster" technique is likely to be in error by a factor of two as against the perceived line width and is not effective for accurate automatic quality control.

Apart from the unsatisfactory nature of the "shrinking raster" technique, the presence of the shadow mask in a color cathode-ray tube presents further difficulties to the observer. The electron beam passes through several of the apertures in the shadow mask and cannot directly be perceived. The shrinking raster technique gives the line width value in the range 50 to 85% of peak intensity. The most usual techniques for determining spot size in a shadow mask cathode-ray tube involve either comparing the spot on the screen with a standard aperture film—the so-called spot gauge—or by counting the number of illuminated phosphor dots, both of which techniques are highly subjective and are not capable of accurately describing a non-circular spot.

SUMMARY OF THE INVENTION

According to the invention, a method of determining the electron beam cross-sectional dimensions and light output at the screen of a shadow mask cathode-ray tube, comprises the steps of arranging a detector to detect light emitted due to a portion of the beam passing through a single aperture in the shadow mask, deflecting the beam so that the whole cross-sectional area of the beam is scanned across the said aperture, and recording the light output received by the detector. Preferably the recording is done automatically.

The invention also comprises apparatus for performing the above method.

For a fuller understanding of the prior art background to the invention, attention is directed to British Pat. No. 1,220,900 (U.S. Pat. No. 3,723,801) which describes a method of measuring beam purity in a shadow mask tube, i.e. the degree to which a beam from a particular gun lands only on a single phosphor. The beam is scanned across the screen and the purity correction varied so that the beam landing position changes by about the diameter of a single phosphor dot. The light output of one color is detected and the purity D.C. level adjusted so that the detected output is the same in both parts of the scan. The adjusted D.C. level is a measure of the initial purity error.

BRIEF DESCRIPTION OF THE DRAWINGS

The invention will further be explained by way of example with reference to the drawings, in which.

DETAILED DESCRIPTION

Figure 1:
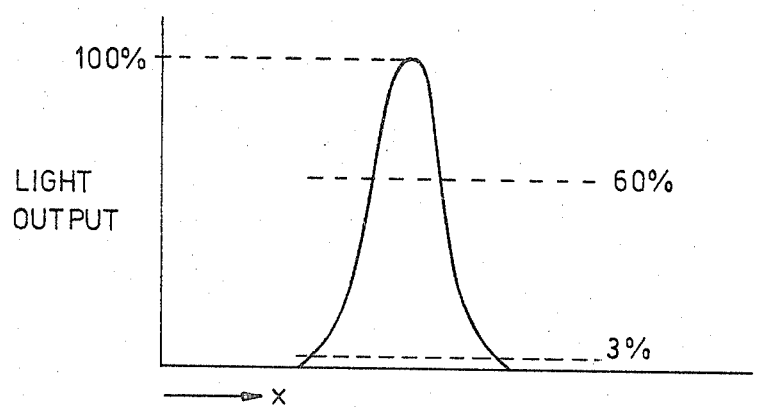
FIG. 1 shows light output from a beam in a monochrome cathode-ray tube.
Figure 2:
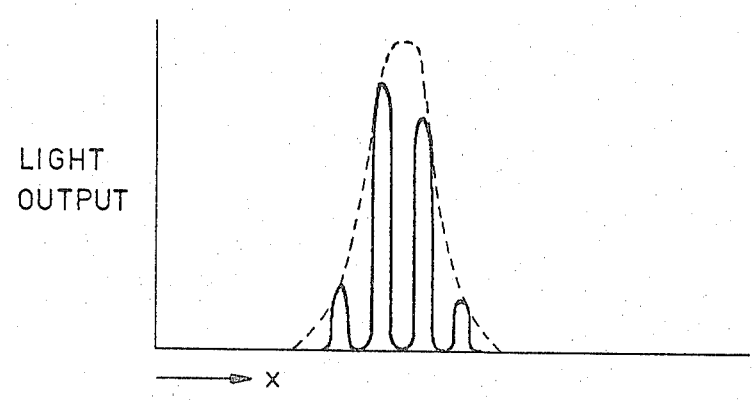
FIG. 2 shows light output from a beam in a shadow mask cathode-ray tube.

Referring to the drawings, FIG. 1 shows a typical light output curve produced by a cathode-ray beam in a monochrome cathode-ray tube. The eye perceives the resultant light spot at about the 3% light output level. The "shrinking raster" technique gives the light output at about the 60% level. FIG. 2 shows the light output of a cathode-ray beam in a shadow mask cathode-ray tube. Much of the energy of the beam is intercepted by the mask and the light output depends on the position of the beam relative to the apertures in the mask. Using known methods, measurement of the beam can only be attempted by indirect techniques and is liable to considerable error.

Figure 3:
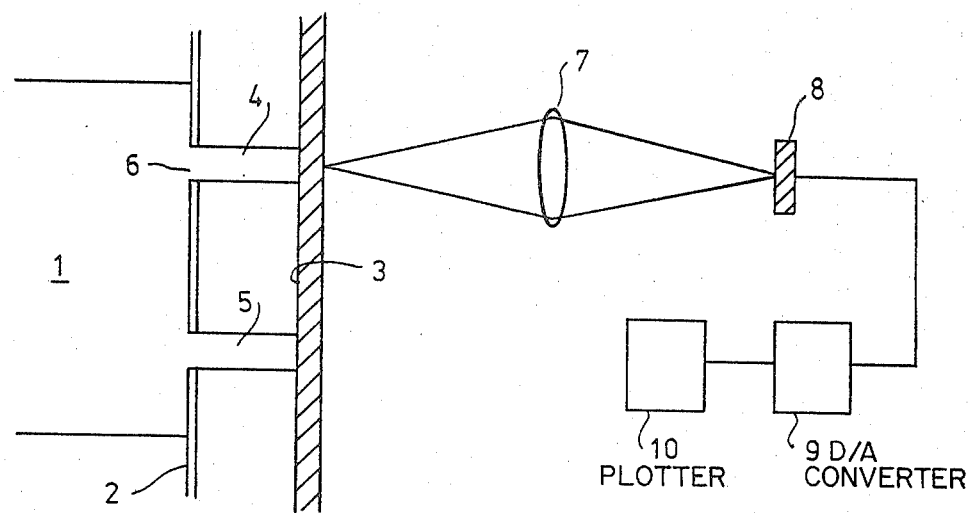
FIG. 3 is a block diagram of apparatus for performing the method of the invention.
Figure 5:
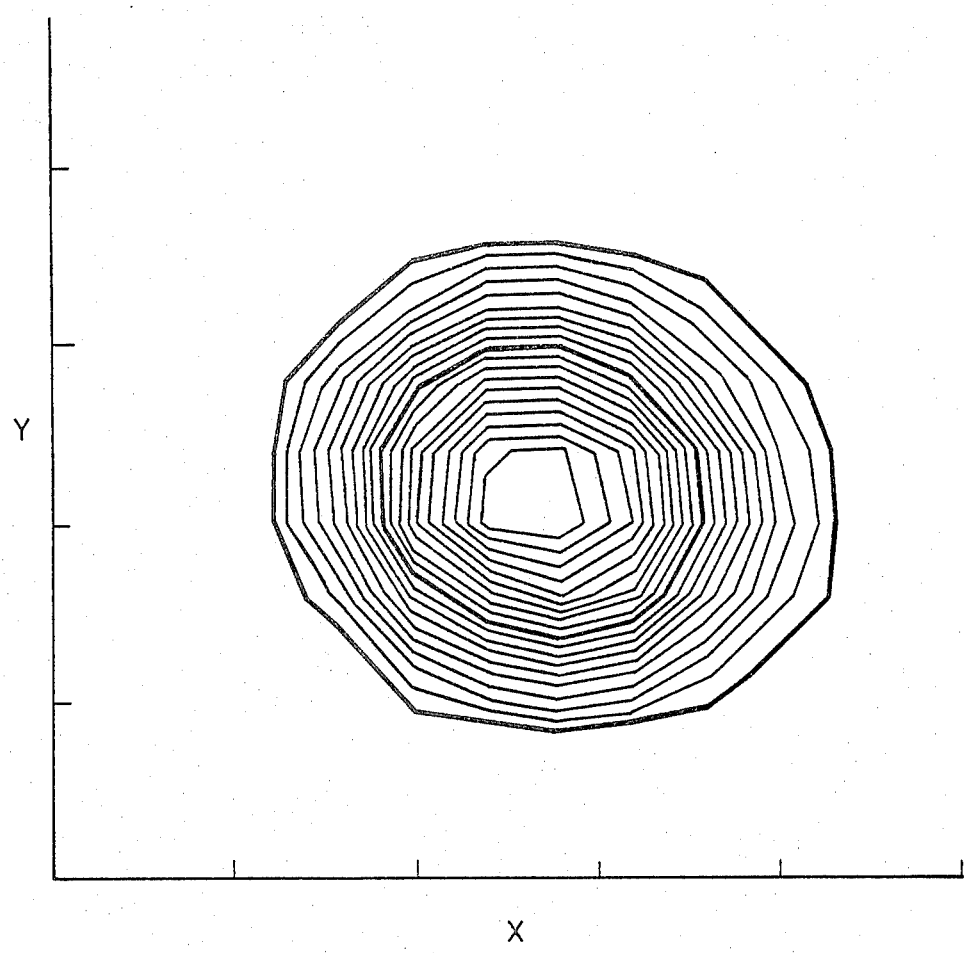
FIG. 5 is a typical plot obtained by use of the method of the invention.

A schematic diagram of apparatus for performing the invention is shown in FIG. 3. A cathode-ray beam is intercepted by the shadow mask 2 and strikes the phosphor coated screen 3 as a set of rays 4, 5. Light generated by ray 4, which passes through aperture 6 in the shadow mask 2, is focussed by optical system 7 on to a photocell 8. The output of photocell 8 is digitized by analog-to-digital converter 9 and plotted graphically by plotter 10. The beam 1 is moved a short distance so that a new region of the beam passes through aperture 6 and the new value of light output is plotted. The procedure is repeated until light output values representative of the whole cross-section of the beam have been obtained. Preferably a contour map of the beam is obtained, as shown in FIG. 5, in which each line connects points of equal light output. In this way, the shape and light output of the beam is clearly displayed. The light output values are normalized, the maximum value being taken as 100. The outer boundary of the plotted beam is the 5% of maximum value contour.

The aperture of the optical system 7 should be small, i.e. it should be focussed, effectively, on only a point of the phosphor dot on which the ray 4 lands. Preferably the beam is moved, between successive measurements, a distance much smaller than the size of shadow mask aperture 6. If a large optical aperture is used there will, in this case, be inaccuracies in the measurement of light output. It is possible to use a large aperture optical system 7 but this must be linked with beam movements which bring an entirely fresh area of the beam to the aperture 6. This provides a much coarser measurement of the beam which may be satisfactory for some purposes.

Preferably the procedure is automatic, the X and Y deflection coils of the cathode-ray tube being supplied with sets of incremental currents each sufficient to deflect the beam a predetermined amount, the next incremental currents being supplied only when a light output has been recorded.

Figure 4:
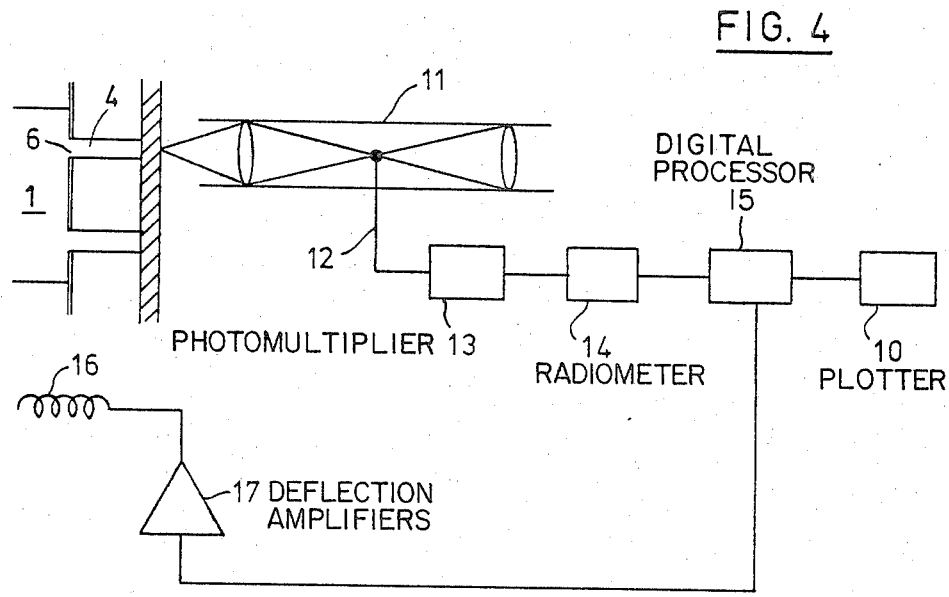
FIG. 4 is a block diagram of another arrangement of apparatus for performing the method of the invention.

In one practical arrangement, shown in FIG. 4, the optical system is a microscope 11 with a light fiber bundle 12 fixed at the image plane of the microscope objective. The light fiber bundle 12 is connected to a photomultiplier 13 which is connected to a digital radiometer 14. The photomultiplier and radiometer are standard instruments. The output of radiometer 14 is processed by a digital processor 15 to control plotter 10 using commercially available programs such as the APL GRAPHPAK. Processor 15 also controls the application of deflection signals to the deflection coils 16 by deflection amplifiers 17. The cathode-ray beam, which may be between one and two mm in diameter, is scanned in a square raster of 2 mm in steps of about 0.1 mm.

Figure 6:
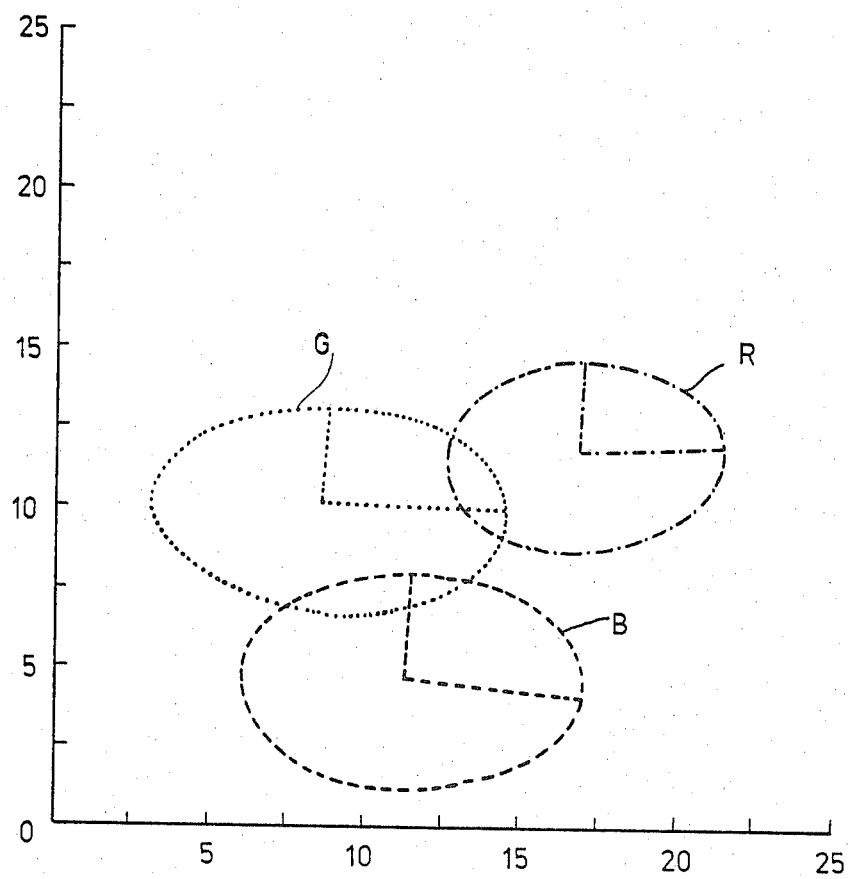
FIG. 6 is a plot showing how the invention can be used to obtain a precise indication of the degree of misconvergence in a shadow mask cathode-ray tube.

The method of the invention can also be used for accurately determining the convergence of the three beams of a shadow-mask cathode-ray tube. The light output of each beam in turn is measured and recorded as described above. For the different guns, the optical system is focussed on the center of the appropriate phosphor dot or stripe. The results are plotted as shown in FIG. 6 which shows the shape of the beam cross-sections R, B and G from the red, blue and green guns respectively. The coordinates of the red and blue beams are transformed so that the origin is the green phosphor. The light output readings for each beam are plotted on a scale normalized relative to the maximum light output of the beam. The relative brightnesses of the beams do not affect the beam measurements. In FIG. 6, the major and minor half-axes are shown. The outer boundary of the beam is smoothed and the maximum and minimum diameters found and plotted at the 5% of maximum level contour. Contoured beam plots can also be produced but these do not provide such a clear diagram.

The technique of the invention can be used for quality control of the products of a cathode-ray tube assembly line or, when applied to the misconvergence, in computing dynamic convergence functions, i.e. the corrections to be applied to the static convergence fields as the cathode-ray beam is being scanned across the screen.

While the invention has been particularly shown and described with reference to a preferred embodiment thereof, it will be understood by those skilled in the art that various changes in form and detail may be made therein without departure from the spirit and scope of the invention.

Having thus described my invention what I claim as new and desire to secure by Letters Patent, is:

1. A method of determining the beam cross-sectional dimensions and light output at the screen of a shadow mask cathode-ray tube, comprising the steps of arranging a detector to detect light emitted due to a portion of the beam passing through a single aperture in the shadow mask, deflecting the beam incrementally so that the whole cross-sectional area of the beam is scanned across the said aperture, and recording the light output received by the detector while said beam is stationary.

2. A method as claimed in claim 1, wherein the light output received by the detector is plotted as a countour map of beam cross-section with contour lines joining points of equal detected light intensity.

3. A method of measuring the convergence of the beams of a shadow mask cathode-ray tube, comprising arranging a detector to detect the light emitted by a given phosphor associated with a given aperture in the shadow mask, operating the electron gun associated with the given phosphor, performing a method of determining the beam cross-sectional dimensions and light output at the screen of a shadow mask cathode-ray tube, in respect of the beam emitted by the associated electron gun, said method of determining comprising the steps of arranging a detector to detect light emitted due to a portion of the beam passing through a single aperture in the shadow mask, deflecting the beam so that the whole cross-sectional area of the beam is scanned across the said aperture, and recording the light output received by the detector, and repeating the procedure of said method of determining for each phosphor associated with the given aperture and each electron gun, the respective light output plots being superimposed.

4. A method according to claim 2 wherein the detected light output of each beam is plotted on a scale normalized relative to the maximum light output generated by the beam.

5. A method according to claim 3 wherein the detected light output of each beam is plotted on a normalized relative to the maximum light output generated by the beam.

6. Apparatus for determining the beam cross-sectional dimensions and light output at the screen of a shadow mask cathode-ray tube, comprising a detector having a small optical aperture arranged to detect light emitted due to the portion of the beam passing through only a single aperture in the shadow mask, means to deflect the beam so that the whole cross-sectional area of the beam is scanned across the said aperture, and means to record the light output received by the detector.

7. Apparatus as claimed in claim 6, further comprising a plotter to graph light output received by the detector as a countour map of beam cross-section with contour lines joining points of equal detected light intensity.

8. Apparatus for determining the beam cross-sectional dimensions and light output at the screen of a shadow mask cathode-ray tube, comprising a detector arranged to detect light emitted due to a portion of the beam passing through a single aperture in the shadow mask, means to deflect the beam so that the whole cross-sectional area of the beam is scanned across the said aperture, and means to record the light output received by the detector comprising a plotter to graph light output received by the detector as a contour map of beam cross-section with contour lines joining points of equal detected light intensity, said apparatus being adapted to measure the convergence of the beams of a shadow mask cathode-ray tube, and comprising means to cause detector to detect the light emitted by a given phosphor associated with a given aperture in the shadow mask, and means for operating the electron gun associated with the given phosphor, said apparatus being adapted and arranged for repetitive operation with respect to each phosphor associated with the given aperture and each electron gun, the respective light output plots being superimposed.

* * * * *